United States Patent
Baitz et al.

[11] Patent Number: 6,037,548
[45] Date of Patent: Mar. 14, 2000

[54] SCALES FOR RETAIL OUTLETS

[75] Inventors: Günter Baitz, Berlin; Joachim Burchart, Schlangen; Hartmut Kamin, Berlin, all of Germany

[73] Assignee: Siemens Nixdorf Informationssysteme AG, Paderborn, Germany

[21] Appl. No.: 09/125,740

[22] PCT Filed: Sep. 30, 1996

[86] PCT No.: PCT/EP96/04278

§ 371 Date: Aug. 24, 1998

§ 102(e) Date: Aug. 24, 1998

[87] PCT Pub. No.: WO97/31345

PCT Pub. Date: Aug. 28, 1997

[30] Foreign Application Priority Data

Feb. 22, 1996 [WO]  WIPO ............... PCT/DE96/00278

[51] Int. Cl.[7] ............... G01G 19/22; G01G 23/02; G01G 21/28; H05K 5/00
[52] U.S. Cl. ............... 177/25.13; 177/124; 177/238; 361/680; 361/685
[58] Field of Search ............... 177/124, 126, 177/127, 180, 238, 239, 240, 241, 242, 243, 244, 25.11, 25.12, 25.13, 25.14, 25.15, 177, 2; 361/680, 685

[56] References Cited

U.S. PATENT DOCUMENTS

| | | | |
|---|---|---|---|
| 4,274,500 | 6/1981 | Kuhnle | 177/25.11 |
| 4,582,151 | 4/1986 | Mairot et al. | 177/244 |
| 4,676,327 | 6/1987 | Luechinger | 177/126 |
| 4,736,332 | 4/1988 | Crease | 361/685 |
| 4,790,504 | 12/1988 | Wills et al. | 248/183 |
| 4,841,412 | 6/1989 | Heys, Jr. et al. | 361/393 |
| 4,862,978 | 9/1989 | Borchard | 177/180 |
| 4,870,604 | 9/1989 | Tatsuno | 361/680 |
| 5,287,245 | 2/1994 | Lucente et al. | 361/680 |
| 5,307,281 | 4/1994 | Wollmann | 177/25.15 |
| 5,572,399 | 11/1996 | Shirato et al. | 361/680 |
| 5,841,076 | 11/1998 | Schwartz et al. | 177/25.13 |

FOREIGN PATENT DOCUMENTS

| | | |
|---|---|---|
| 0 052 771 | 6/1982 | European Pat. Off. |
| 0 085 482 | 8/1983 | European Pat. Off. |
| 0 380 082 | 8/1990 | European Pat. Off. |
| 0 577 170 | 1/1994 | European Pat. Off. |
| 2 407 518 | 5/1979 | France. |
| 37 41 704 | 6/1989 | Germany. |
| 79/00514 | 8/1979 | WIPO. |
| 90/00304 | 1/1990 | WIPO. |

OTHER PUBLICATIONS

IBM Technical Disclosure Bulletin, vol. 34, No. 9, Feb. 1992, "Combination Keypad/Scale Using Strain Gauge Transducers", p. 77–78.

IBM Technical Disclosure Bulletin, Nov. 1985, vol. 28, "Keyboard Support Lifting Assembly With Locking Feature," pp. 1–3.

Primary Examiner—Randy W. Gibson
Attorney, Agent, or Firm—Hill & Simpson

[57] ABSTRACT

A description is given of scales (100) which are intended for retail outlets and can be adapted to various applications by being equipped with different input means (126, 130) and memory means (116, 118).

14 Claims, 3 Drawing Sheets

(b)

(a)

SCALES FOR RETAIL OUTLETS

BACKGROUND OF THE INVENTION

1. Field of the Invention

The present invention relates to scales for retail outlets having an electronics box whose topside is covered by a weighing plate and which contains a data processing and control unit, and having an operating area and a display area.

2. Description of the Related Art

Depending on the application, different requirements are made regarding the equipment and operability of scales used in retail outlets. For example, self-service scales in fruit and vegetable departments and service scales are operated by someone standing, while checkout personnel in a retail outlet are seated while operating checkout scales assigned to a cash register. This entails different, in part mutually contradictory ergonomic design principles, which have so far been only imperfectly honored by a single design of scales.

The desire for equipment which satisfies individual applications relates to input means and display means, but also to different memory and identification media, such as drives for floppy disks or CD-ROM, connections for electronic, electro-optical or electromechanical mass storage for example in accordance with the PCMCIA standard, as well as readers for magnetic strip cards or chipcards, by means of which an operator or a maintenance technician identify themselves at the scales. The housing of the scales would have to be changed for each variety of equipment. However, different built-on facilities render scales more expensive.

SUMMARY OF THE INVENTION

It is therefore the object of the invention to provide a design of scales by means of which scales for retail outlets can be adapted by simple measures to different conditions of use.

The object is achieved with scales having an electronics box whose topside is covered by a weighing plate, and which contains a data processing and control unit, and having an operating area and a display area; attached to the front side of the electronics box is a projecting structure whose console-shaped keypad surface can optionally be equipped with a keypad or a combined display/input device; at least one chipcard reader and/or one identity card reader and/or one floppy disk drive and/or one drive for optical memory media and/or one maintenance lock and/or one card receptacle conforming to the PCMCIA standard can be installed in a vertical front wall of a housing situated below the keypad surface; a front area of the keypad surface is bent away downward; and the keypad surface is mounted on the projecting structure of the scales so that it can pivot about a pivot axis, which extends at and is parallel to the rear edge of the keypad surface between a position in which its front, bent-away area latches over the vertical front wall, and a position which exposes.

The possibility of optionally equipping the scale with different keypads or else with a combined display/input device not only permits scales for retail outlets to be designed for specific applications, but also permits them to be easily retrofitted should a change in the application or new input units so require. For example, the use of a flat monitor with a so-called touch screen or a pen computer surface or with soft keys opens up new possibilities of use both where customers are served and in self-service.

Thus, the present invention makes it possible in a simple way, for example, to make use on scales used as service scales of a keypad which is quick to operate, has relatively few keys and a perceptible pressure point and is to be operated blind. The cash register keypad or a second keypad which can be operated in parallel with the latter and has an identical key layout could be permanently arranged in front of scales used as checkout scales. By contrast, in a particularly advantageous way it is possible to use on self-service scales a touch screen on which the goods on offer are represented graphically. The goods to be weighed are identified by simply touching the corresponding image on the display screen. If—as is described in a development of the concept of the invention—the projecting structure can be detached from the electronics box, there is additionally the possibility of an ergonomically optimum arrangement of the keypad or of the combined display/input device.

Similar possibilities for optionally equipping the scales arise for memory means, which have to be operated only sporadically, such as, for example, floppy disk drives for loading programs, CD-ROM drives for operating a PLU memory, chipcard readers for the operator or maintenance technician to log on, mass storage in accordance with the PCMCIA standard for electronic magazines, etc. An aperture is to be provided in the housing of the scales in each case for installing such units, the intention being for unoccupied apertures to be sealed for security reasons. Covering these apertures by means of the downwardly bent-away area of the keypad surface meets this requirement. At the same time, said units are withdrawn from access by nonauthorized persons.

BRIEF DESCRIPTION OF THE DRAWINGS

The invention is described below with the aid of exemplary embodiments represented in the drawing, in which.

DETAILED DESCRIPTION OF THE PREFERRED EMBODIMENTS

Figure 1:
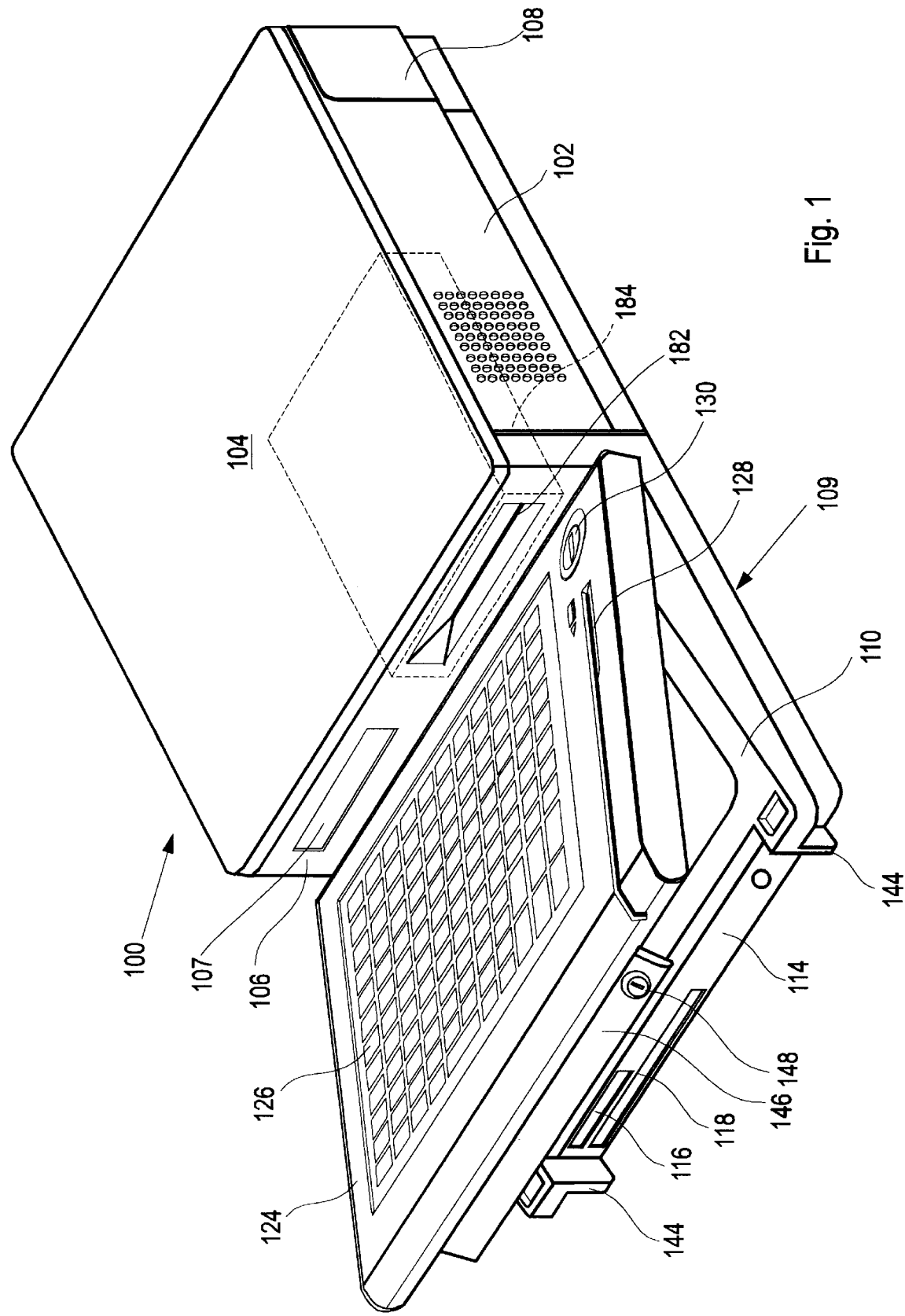
FIG. 1 shows scales for retail outlets, in a perspective front view.

Scales 100 for retail outlets are represented in a perspective front view in FIG. 1. They comprise an electronics box 102 whose topside is covered by a weighing plate 104. An information wall 106, facing a user, of the scales 100 is fitted with a display device 107. Next to the latter, a printed matter outlet 182 of a printer 184 installed in the electronics box 102 is let into the information wall 106. The rear area of the scales 100 is sealed by a detachable cable cover 108.

Arranged in front of the electronics box 102 is a projecting structure 109, whose topside 110 drops off obliquely forward. The projecting structure 109 is detachably connected to the electronics box 102. This has the advantage that the electronics box 102 and the projecting structure 109 can be moved apart from one another depending on the application of the scales 100. The projecting structure. 109 can, however, also be an integral component of the electronics box 102. The information wall 106 of the scales 100 is assigned to the projecting structure 109. However, it can also be part of the electronics box 102.

Figure 2:
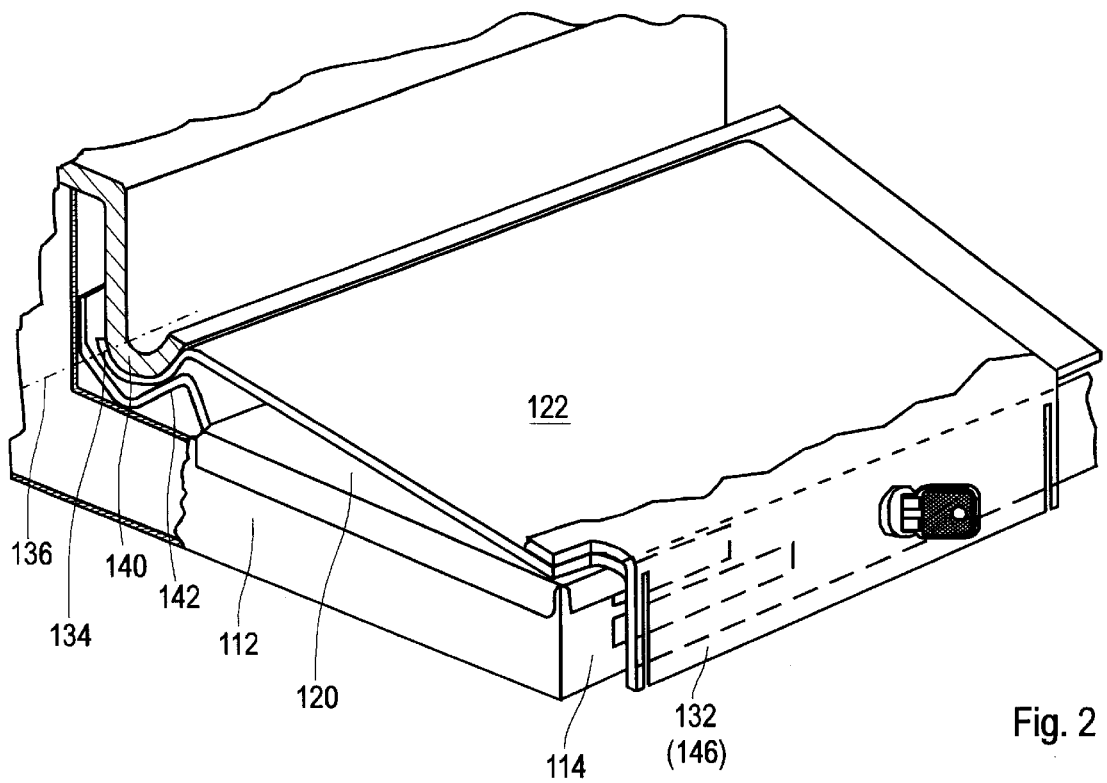
FIG. 2 shows the scales from FIG. 1 without a keypad, in a sectioned perspective partial view.
Figure 3:
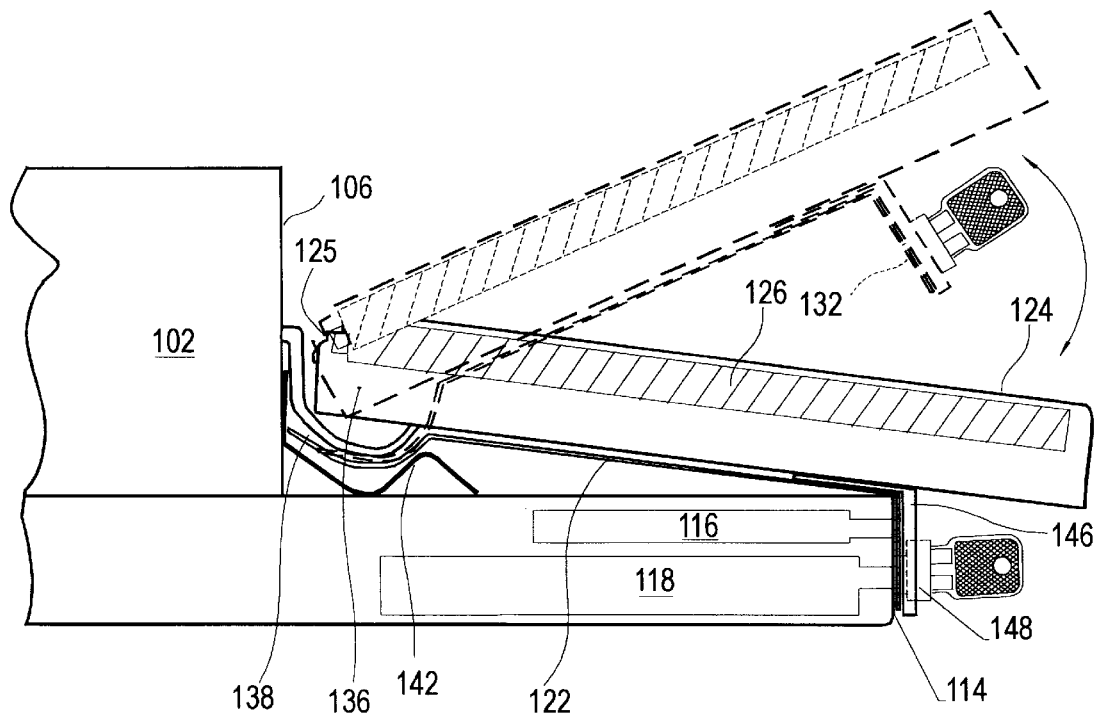
FIG. 3 shows the sales shown in FIG. 1, with the keypad in two positions in a diagrammatic side view.

The projecting structure 109 encloses a housing 112 (FIG. 2) of metal, in whose front wall 114, which drops off vertically, there are installed a chipcard reader 116 and a floppy disk drive 118. The topside of the housing 112 forms a cover plate 120 above which there is pivotably arranged a keypad surface 122 likewise made from sheet metal. Fastened to the keypad surface 122 is a keypad housing 124 in which there are accommodated a keypad 126, a swiping magnetic card reader 128 and a maintenance lock 130. The latter is connected to a switching element (known per se and therefore not represented) which, in a maintenance position, identifies to a control device (likewise not represented) of the scales 100 an employee or an authorized maintenance technician of the retail outlet. A front area 132, projecting beyond the housing 112, of the keypad surface 122 is bent away downward, with the result that it comes to be situated in front of the front wall 114 of the housing 112, and covers the wall completely. The rear area of the keypad surface 122 is bent downward into a groove 134 which extends over the entire width of the surface and has a cross-section in the shape of a circular segment. The center line of the groove 134 coincides with a pivot axis 136 about which the keypad surface 122 can pivot. The groove 134 is guided in a gap 138 between the cover plate 120 and a rib 140, which is integrally formed on the information wall 106 and whose surface of contact with the keypad surface 122 is adapted to the circular segment shape of the groove 134. The cover plate 120 can be flat in the area of contact of the groove 134. However, even better guidance of the pivoting movement of the keypad surface 122 about the pivot axis 136 results when the cover plate 120 is shaped into a corrugation 142 in this area (FIGS. 2 and 3). The groove 134 is situated in this case in a wave trough. There is large-area galvanic contact between the keypad surface 122 and the cover plate 120 in every pivoting position, and this ensures that the keypad surface 122 is always connected to the frame potential of the housing 112.

FIG. 3 shows the keypad surface 122 together with the keypad housing 124 fastened thereto, in a folded-down position represented by full lines, and a pivoted-up position represented by dashes. The front area 132 of the keypad surface 122 covers the front wall 114 in the first-named position, and thereby prevents access to the chipcard reader 116, which is installed in the wall, and to the floppy disk drive 118. Furthermore, FIG. 3 shows that the pivot axis 136 of the keypad surface 122 is situated so far in front of the information wall 106 that the rear edge 125 of the keypad housing 124 does not collide in any position with the information wall 106 or with elements installed therein.

The front area 132 of the—folded-down—keypad surface 122 is situated between projections 144 which are integrally formed on the front of the projecting structure 102 (FIG. 1). A cover 146 placed on the front area 132 (FIG. 3) finishes at the front flush with the projections 144, thus producing a unit without troublesome projections. Installed in the cover 146 is a lock 148, which also penetrates the front area 132 of the keypad surface 122 and can be used to lock the keypad surface 122 together with the front wall 114. It is thereby possible to reliably prevent unauthorized access to the chipcard reader 116 or the floppy disk drive 118.

Figure 4:
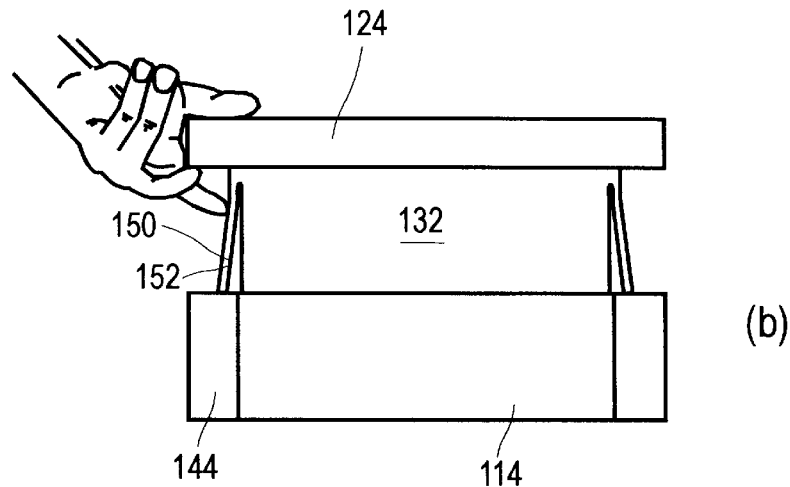
FIGS. 4a and 4b show a first exemplary embodiment of a keypad surface support device in a front view, FIG. 4(a) in the folded-down position, and FIG. 4(b) in the pivoted-up position.
Figure 4:
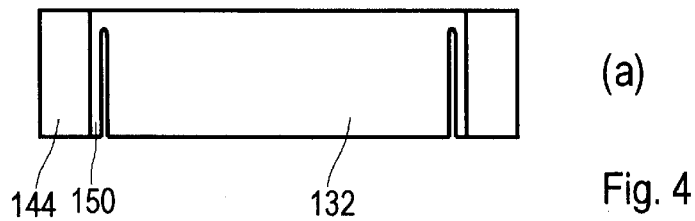
Figure 5:
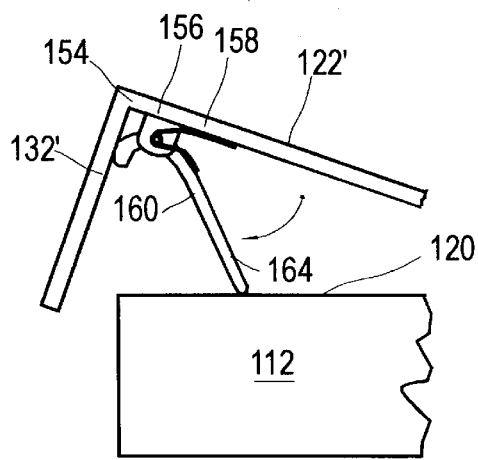
FIGS. 5a and 5b shows a second exemplary embodiment of a keypad surface support device in a sectioned side view, FIG. 5(a) in the folded-down position, and FIG. 5(b) in the pivoted-up position.

FIGS. 4 and 5 represent two different exemplary embodiments of a support device for the keypad surface 122. This is used, on the one hand, to hold the keypad surface 122 in its pivoted-up position, so that devices installed in the front wall 114 of the housing 112—in the exemplary embodiment according to FIG. 1, these are the chipcard reader 116 and the floppy disk drive 118—can be operated conveniently. On the other hand, it prevents the keypad surface 122 from striking hard against the housing 112 as it is being folded down, something which could, for example, lead to the destruction of a magnetic disk drive installed in the housing 112.

FIG. 4 shows a first exemplary embodiment of a support device for the keypad surface 122 (a) in the folded-down position, and (b) in the pivoted-up position. A support 150 protruding to the side obliquely at an angle of approximately 10° is integrally formed in each case on the side edges of the front, bent-away area 132 of the keypad surface 122. With the keypad surface 122 folded up, its lower end 152 is supported on the adjacent projection 144. To fold down the keypad surface 122, the operator has to use both hands (represented in FIG. 4b for one side) to grip the keypad housing 124 fastened thereon at the side and to press the supports 150 toward one another with a free finger until they are aligned parallel to the adjacent projection 144. Thereafter, the keypad surface 122 can be guided downward. During pivoting downward, the supports 150 slide along the projections 144 under an increased frictional resistance which is produced by the action of an elastic restoring force of the laterally bent supports. This ensures a low-impact transition of the keypad surface 122 from the pivoted-up position into the folded-down position (FIG. 4a).

FIG. 5 shows a second exemplary embodiment of a support device for a keypad surface 122' (a) in the folded-down position, and (b) in the pivoted-up position. A lug 156 is integrally formed to the right and left on the side, facing the housing 112, of the keypad surface 122' in the vicinity of the bending edge 154, about which the front area 132' of the keypad surface 122' is bent away downward. Mounted in each case on the lugs is a two-armed support lever 160 to which the force of a leg spring 158 is applied in the direction of the housing 112, and which can be pivoted about a spindle 162 aligned parallel to the pivot axis 136 of the keypad surface 122'. A first limb 164 of the support lever 160 is supported on the cover plate 120 of the housing 112, while the second limb 166 is bent away downward. The limbs 164, 166 enclose an angle of approximately 60°.

Figure 6:
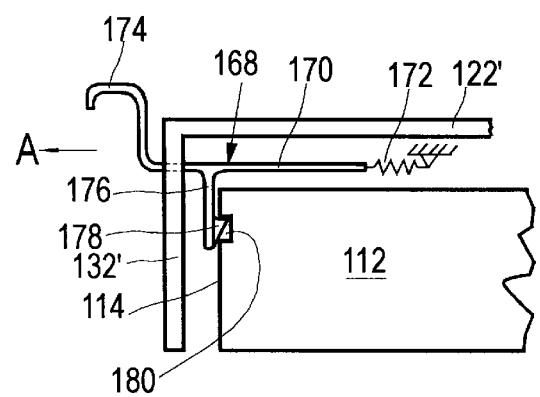
FIG. 6 shows a locking device for a keypad surface, in a diagrammatic side view.
Figure 5:
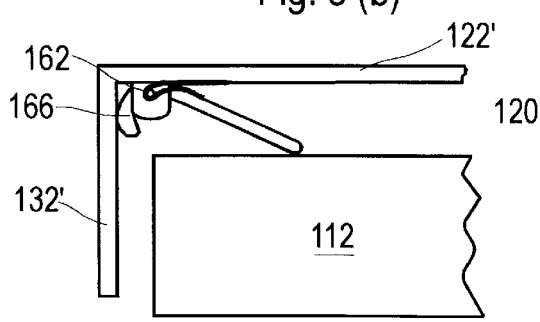

In its folded-down position (FIG. 5a), the keypad surface 122' is held by a locking device 168 described further below (FIG. 6). If this locking device is released, the support lever 160 straightens up under the guiding force of the leg spring 158 and in so doing brings the keypad surface 122' into its pivoted-up position (FIG. 5b), without the need for it to be raised by hand. In this position, the second limb 166 is supported on the front area 132' of the keypad surface 122', and thereby limits the pivoting range of the support lever 160. The keypad surface 122' is pressed downward manually in order to fold it downward. The lower end of the first support lever limb 164 slides along in this case on the cover plate 120 with the leg spring 158 simultaneously being tensioned. As in the case of the exemplary embodiment of the support device according to FIG. 4, this arrangement likewise ensures a low-impact transition of the keypad surface 122' from the pivoted-up position into the folded-down position (FIG. 5a). Moreover, it has the advantage of being operable one-handed.

FIG. 6 shows the locking device 168 for the keypad surface 122' in a sectioned side view. On the side, facing the housing 112 of the keypad surface 122', it contains a longitudinally displaceable slider 170 which is aligned parallel to the keypad surface. The slider 170 penetrates the front area 132' of the keypad surface 122', where it is provided with a handle 174. Integrally formed on the slider 170 on the inside of the front area 132' is a downwardly pointing tongue 176 on whose lower end a hook-shaped latching projection 178 is constructed. In its locking position, the latter engages in a latching recess 180 in the front wall 114 of the housing 112. An actuating force of a helical tension spring 172 which is directed toward the housing 112 is applied to the slider 170. To unlock, the slider 170 is moved in the direction of the arrow A. The latching projection 178 disengages with the latching recess 180, and the keypad surface can swing upward.

Although other modifications and changes may be suggested by those skilled in the are, it is the intention of the inventor to embody within the patent warranted hereon all changes and modifications as reasonably and properly come within the scope of their contribution to the art.

We claim:

1. Scales, comprising:
    an electronics box whose topside is covered by a weighing plate,
    a data processing and control unit in said electronics box,
    an operating area and a display area on said electronics box,
    a projecting structure attached to a front side of the electronics box, said projecting structure including a console-shaped keypad surface,
    an input for a data source element in a vertical front wall of said electronics box below said keypad surface, wherein said data source element is selected from the group consisting of:
        at least one chipcard reader and
        at least one identity card reader and
        at least one floppy disk drive and
        at least one drive for optical memory media and
        at least one card receptacle conforming to the PCMCIA standard,
    a front area of the keypad surface being bent away downward, and
    a projecting structure of said electronics box on which said keypad surface is mounted so that said keypad surface can pivot about a pivot axis which extends at and is parallel to a rear edge of said keypad surface between a position in which its front, bent-away area latches over the vertical front wall, and a position which exposes the vertical front wall.

2. Scales as claimed in claim 1, further comprising:
    projections extending from either side of said vertical front wall which laterally bound said vertical front wall, with the keypad surface folded down, the front area being situated between said projections.

3. Scales as claimed in claim 2, further comprising:
    a support at a side edge of said front area which with the keypad surface folded down extends parallel to an adjacent one of said projections and with the keypad surface folded up spreads away laterally from the bent-away area under action of an elastic spring force, a lower end of said support being supported on the adjacent one of said projections.

4. Scales as claimed in claim 1, further comprising:
    at least one support lever pivotally connected to an underside of said keypad surface,
    a spring mounted so that its force is applied in a direction of the electronics box, p1 a spindle aligned parallel to a pivot axis of the keypad surface and on which said at least one support lever is pivoted, and
    said at least one support lever having one limb supported on a cover plate of the electronics box.

5. Scales as claimed in claim 1, further comprising:
    a lock by which the keypad surface is selectively locked with the electronics box in its folded-down position.

6. Scales as claimed in claim 1, further comprising:
    a printer in the electronics box which is operable to output printed matter through an opening in a side wall facing the projecting structure.

7. Scales as claimed in claim 1, further comprising:
    an information wall located behind the keypad surface and in which there is installed one of a display device and a printed matter outlet of a printer.

8. Scales as claimed in claim 1, wherein the projecting structure is an integral component of the electronics box.

9. Scales as claimed in claim 1, wherein the projecting structure and the electronics box are detachably connected to one another.

10. Scales as claimed in claim 9, further comprising:
    an information wall which is part of the projecting structure, said information wall including one of a display device and a printed matter outlet of a printer.

11. Scales as claimed in claim 9, further comprising:
    an information wall which is part of the electronics box, said information wall including one of a display device and a printed matter outlet of a printer.

12. Scales as claimed in claim 7, further comprising:
    a keypad housing, and
    wherein the pivot axis of the keypad surface is at a distance from the information wall such that with the keypad surface folded up a rear edge of a keypad housing projecting beyond the keypad surface does not collide with the information wall.

13. Scales as claimed in claim 12, wherein said keypad surface is of sheet metal and is bent about the pivot axis into a groove in the shape of a circular segment, said groove being guided pivotably in a gap which is constructed between the cover plate of the housing and a rib, which is integrally formed on the projecting structure.

14. Scales as claimed in claim 1, wherein said console-shaped keypad surface includes one of a keypad and a combined display/input device.

* * * * *